US012602286B2

(12) United States Patent
Zhu

(10) Patent No.: US 12,602,286 B2
(45) Date of Patent: Apr. 14, 2026

(54) STORAGE CLASS MEMORY, DATA PROCESSING METHOD, AND PROCESSOR SYSTEM

(71) Applicant: HUAWEI TECHNOLOGIES CO., LTD., Shenzhen (CN)

(72) Inventor: Xiaoming Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/740,001

(22) Filed: Jun. 11, 2024

(65) Prior Publication Data

US 2024/0330109 A1    Oct. 3, 2024

Related U.S. Application Data

(63) Continuation of application No. PCT/CN2022/136844, filed on Dec. 6, 2022.

(30) Foreign Application Priority Data

Dec. 13, 2021    (CN) .......................... 202111513788.2
Jan. 30, 2022    (CN) .......................... 202210114650.3

(51) Int. Cl.
G06F 11/10            (2006.01)
(52) U.S. Cl.
CPC ................................ G06F 11/1072 (2013.01)
(58) Field of Classification Search
None
See application file for complete search history.

(56) References Cited

U.S. PATENT DOCUMENTS 10,579,470 B1 *    3/2020    MacLaren ........... G06F 11/1048
11,170,869 B1    11/2021    Helmick et al.
2016/0011940 A1    1/2016    Hu et al.
2022/0012126 A1 *    1/2022    Galbi ...................... G06F 12/12

FOREIGN PATENT DOCUMENTS

CN            111048140 A        4/2020
KR        20160105734 A        9/2016
KR        20190016562 A        2/2019
KR        20210121654 A        10/2021

* cited by examiner

*Primary Examiner* — Guerrier Merant
(74) *Attorney, Agent, or Firm* — Leydig, Voit & Mayer, Ltd.

(57)            ABSTRACT

A plurality of memory chips included in the storage class memory are divided into at least one group. Each group includes a first-type memory chip and a second-type memory chip. The second-type memory chip is configured to store running error correction code, and the first-type memory chip is configured to store data and retry error correction code. The running error correction code is for performing first-level memory error correction on the data stored in the first-type memory chip in the same group. The retry error correction code is for performing, when the first-level memory error correction fails, second-level memory error correction on the data stored in the first-type memory chip.

20 Claims, 9 Drawing Sheets

Storage class memory 100

First-type memory chip 111    Second-type memory chip 112    First-type memory chip 111    Second-type memory chip 112

Memory chip 110 | Memory chip 110 | Memory chip 110 | Memory chip 110 | Memory chip 110 | Clock chip | Memory chip 110 | Memory chip 110 | Memory chip 110 | Memory chip 110 | Memory chip 110

X8    X8    X8    X8    X8        X8    X8    X8    X8    X8

1ˢᵗ group (channel 1)
32+8 bits

2ⁿᵈ group (channel 2)
32+8 bits 10 memory chips 110 with a bit width of 80 bits

STORAGE CLASS MEMORY, DATA PROCESSING METHOD, AND PROCESSOR SYSTEM

CROSS-REFERENCE TO RELATED APPLICATIONS

This application is a continuation of International Application No. PCT/CN2022/136844, filed on Dec. 6, 2022, which claims priority to Chinese Patent Application No. 202210114650.3, filed on Jan. 30, 2022, and Chinese Patent Application No. 202111513788.2, filed on Dec. 13, 2021. All of the aforementioned patent applications are hereby incorporated by reference in their entireties.

TECHNICAL FIELD

This application relates to the computer field, and in particular, to a storage class memory, a data processing method, and a processor system.

BACKGROUND

A storage class memory (SCM) is a new type of storage medium whose storage capacity, access speed, and costs are between those of a main memory (for example, a dynamic random access memory (DRAM)) and a hard disk (for example, a NAND flash). For example, in comparison with the DRAM, the SCM has a persistence capability, prevents data loss after a power failure, and has a larger storage capacity. In comparison with the NAND flash, the SCM has a faster access speed.

Currently, the SCM implements memory error correction based on a built-in controller. Because a storage medium in the controller may cache data, an access latency of the SCM is uncertain, the SCM cannot be compatible with a double data rate (DDR) protocol, and universality of the SCM is low. Therefore, how to improve reliability of the SCM and minimize the access latency of the SCM when the SCM is compatible with the DDR protocol is an urgent problem to be resolved currently.

SUMMARY

This application provides a storage class memory, a data processing method, and a processor system, so that reliability of the SCM can be improved and an access latency of the SCM can be minimized when the SCM is compatible with a DDR protocol.

According to a first aspect, a storage class memory is provided. A plurality of memory chips included in the storage class memory are divided into at least one group, each group of the at least one group includes a first-type memory chip and a second-type memory chip. The second-type memory chip is configured to store running error correction code, and the first-type memory chip is configured to store data and retry error correction code. The running error correction code is for performing first-level memory error correction on data stored in the first-type memory chip in the same group. The retry error correction code is for performing, when the first-level memory error correction fails, second-level memory error correction on the data stored in the first-type memory chip.

In this case, a two-level memory error correction mechanism is used to ensure high reliability of data stored in the storage class memory and minimize an access latency. In comparison with a high-complexity error correction algorithm used by a built-in controller of the SCM to perform memory error correction, which causes a high access latency, the two-level memory error correction mechanism is used in this embodiment of this application. When an error rate of the storage class memory is low, the high reliability of the data stored in the storage class memory can be ensured by using the first-level memory error correction, and the access latency is effectively shortened. When the error rate of the storage class memory is high, the high reliability of the data stored in the storage class memory can also be ensured by using the second-level memory error correction, and the access latency is shortened in combination with the first-level memory error correction. In addition, memory chips of the storage class memory are arranged, so that a bit width of the storage class memory meets a memory bit width indicated by a double data rate (DDR) protocol. In this case, the storage class memory is compatible with the DDR protocol, the storage class memory can be connected to more types of processors, and universality of the storage class memory is improved.

A quantity of first-type memory chips and a quantity of second-type memory chips in each group are determined based on a bit width of the first-type memory chip, a bit width of the second-type memory chip, and the memory bit width indicated by the DDR protocol.

For example, the memory bit width indicated by the DDR protocol is 80 bits, both the bit width of the first-type memory chip and the bit width of the second-type memory chip are 8 bits, 10 memory chips included in the storage class memory are divided into two groups. Each group includes four first-type memory chips and one second-type memory chip. A sum of bit widths of the four first-type memory chips and the second-type memory chip included in each group is 40 bits, and a unit data access amount of each bit is 16 bytes or 32 bytes.

In a possible implementation, the first-type memory chip includes M first-type banks and N second-type banks. The first-type bank is configured to store data. The second-type bank is configured to store the retry error correction code. Therefore, a memory controller or firmware (FW) can perform online switching or upgrade on a quantity of first-type banks and a quantity of second-type banks based on a usage scenario, to improve flexibility to adapt to reliability requirements of different systems.

In another possible implementation, a unit data access amount of the first-type bank and a unit data access amount of the second-type bank each are a unit data access amount of one bit in the bit width of the first-type memory chip. Therefore, a unit data access amount of the storage class memory meets a length of a cache line of the processor connected to the storage class memory, to improve the universality of the storage class memory.

In another possible implementation, the first-type memory chip further includes a third-type bank. The third-type bank is configured to implement a function of performing bad block management on a bank of the first-type memory chip. Therefore, space of the storage class memory is saved, the storage class memory is more easily compatible with a memory (such as a DRAM) that meets the DDR protocol, and the universality of the storage class memory is improved.

According to a second aspect, a data processing method is provided. The method is executed by a controller, and the controller is connected to the storage class memory in the first aspect or any possible one in the first aspect and a processor. The method includes: The controller performs first-level memory error correction on data stored in a first-type memory chip in a same group in the storage class memory. When the first-level memory error correction fails, the controller obtains each first-type memory chip, and performs second-level memory error correction on data stored in the first-type memory chip.

For example, that the controller performs first-level memory error correction on the data stored in the first-type memory chip in the same group in the storage class memory includes: The controller performs, by using hamming code or block code, first-level memory error correction on the data stored in the first-type memory chip in the same group in the storage class memory. The controller performs first-level memory error correction on a single bit in 128 bytes to 512 bytes of the data stored in the first-type memory chip in the same group in the storage class memory.

For example, that the controller performs second-level memory error correction on the data stored in the first-type memory chip includes: The controller performs, by using block code or low-density parity-check code, second-level memory error correction on the data stored in the first-type memory chip. The controller performs second-level memory error correction on hundreds of bits in 2048 bytes to 4096 bytes of the data stored in the first-type memory chip.

In a possible implementation, the method further includes: The controller converts instructions of the processor into instructions of the storage class memory, and converts the instructions of the storage class memory into instructions of the processor. Therefore, the processor performs a read/write operation on the storage class memory.

According to a third aspect, a processor system is provided. The processor system includes a controller, the storage class memory in the first aspect or any possible one in the first aspect, and a processor. The controller is separately connected to the processor and at least one storage class memory. The controller is configured to perform an operation step of the method in the second aspect or any possible one in the second aspect.

This application may further combine the implementations provided in the foregoing aspects to provide more implementations.

DESCRIPTION OF EMBODIMENTS

Figure 1:
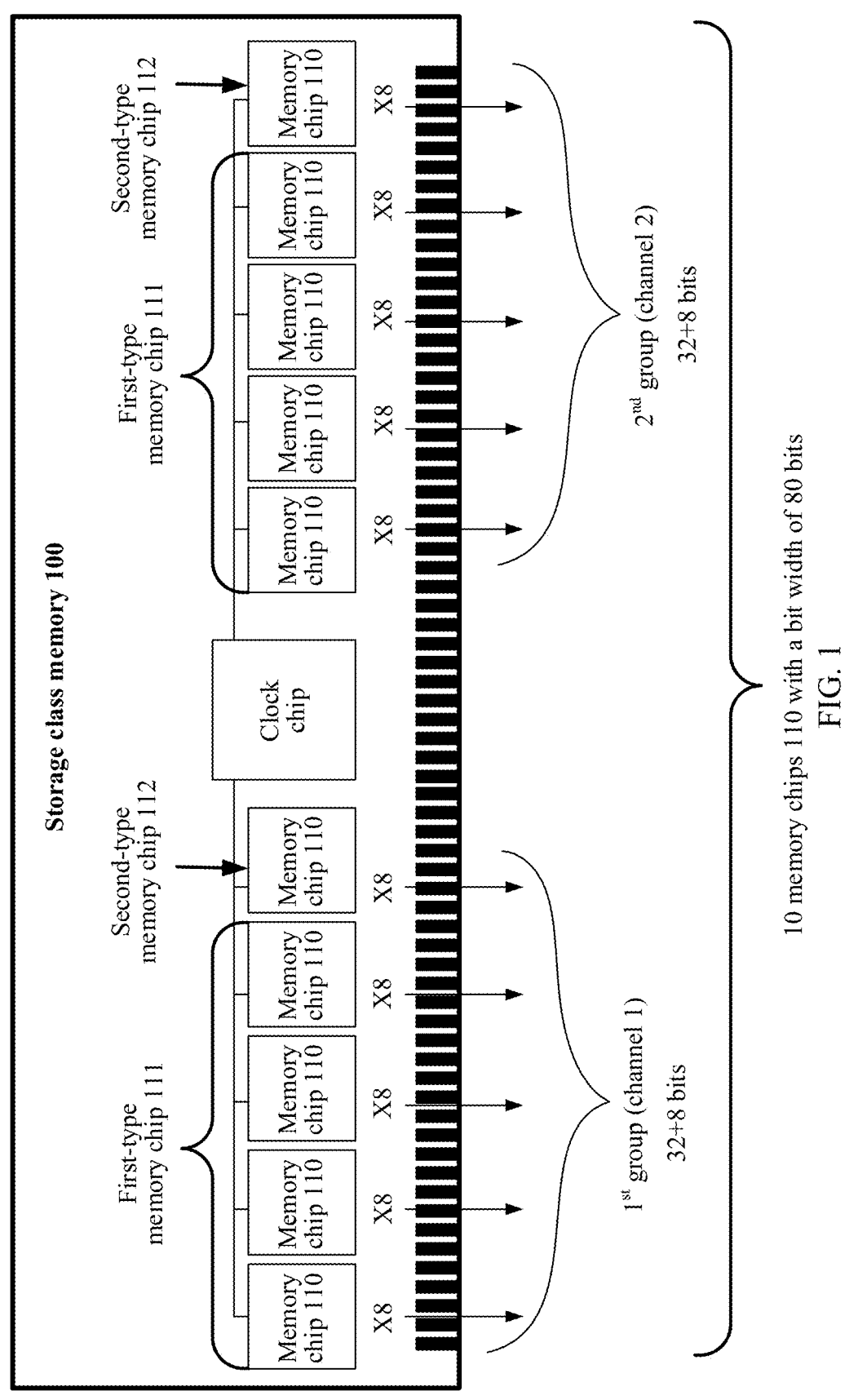
FIG. 1 is a schematic diagram of a structure of a storage class memory according to an embodiment of this application.

In a digital circuit, a smallest data unit is a bit, and the bit is also a smallest data unit of a memory (or main memory). A value of one bit is "0" or "1", and eight consecutive bits form one byte. In a machine language, the byte represents a letter or a number. A value of a single bit stored in the memory may change due to an electric field, a magnetic field, or even cosmic ray interference. If a value of a single bit in a byte that is important for system operation changes, a system error may occur, resulting in system breakdown or another fault.

Error correcting code (ECC) is a technology that can implement error checking and error correction. An error-correcting code memory (ECC memory) is a memory to which the ECC technology is applied, in other words, is a memory that can implement error checking and error correction. The error-correcting code memory is widely used in a server and a graphics workstation, so that stability and reliability of computer operation can be improved.

Embodiments of this application provide a storage class memory, and in particular, provide a storage class memory with high reliability and a low latency. To be specific, a two-level memory error correction mechanism is used to ensure high reliability of data stored in the storage class memory and minimize an access latency. In addition, memory chips of the storage class memory are arranged, so that a bit width of the storage class memory meets a memory bit width indicated by a double data rate (DDR) protocol. In this case, the storage class memory is compatible with the DDR protocol, the storage class memory can be connected to more types of processors, and universality of the storage class memory is improved.

In embodiments of this application, the memory chip may be a phase change memory (PCM). The phase change memory is a storage apparatus that stores data by using an electrical conductivity difference shown when a special material (for example, chalcogenide) is converted between a crystalline state and an amorphous state. The memory bit width refers to an amount of data that can be transmitted by a memory at a time. A larger bit width indicates a larger amount of data to be transmitted at a time. The memory bit width may also be referred to as a data bit width, or referred to as a bit width for short.

A plurality of memory chips included in the storage class memory are divided into at least one group. Each of the at least one group includes a first-type memory chip and a second-type memory chip. It may be understood that the at least one group refers to at least one channel of a DDR. A quantity of first-type memory chips and a quantity of second-type memory chips in each group are determined based on a bit width of the first-type memory chip, a bit width of the second-type memory chip, and the memory bit width indicated by the DDR protocol, so that the bit width of the storage class memory meets the memory bit width indicated by the DDR protocol.

The second-type memory chip is configured to store running error correction code. The running error correction code is for performing first-level memory error correction on data stored in the first-type memory chip in the same group. It should be understood that the running error correction code may be generated based on the data stored in the first-type memory chip that belongs to the same group. The first-level memory error correction refers to performing memory error correction on the data stored in the first-type memory chip that belongs to the same group. For example, running error correction code stored in a second-type memory chip included in the $1^{st}$ group is generated based on the data stored in the first-type memory chip included in the $1^{st}$ group. The running error correction code stored in the second-type memory chip included in the $1^{st}$ group is for performing first-level memory error correction on the data stored in the first-type memory chip included in the $1^{st}$ group.

The first-type memory chip is configured to store data and retry error correction code. The retry error correction code is for performing, when the first-level memory error correction fails, second-level memory error correction on the data stored in the first-type memory chip. It should be understood that the retry error correction code may be generated based on the data stored in the first-type memory chip. The second-level memory error correction refers to performing memory error correction on data stored in each first-type memory chip. For example, retry error correction code stored in a first-type memory chip included in the $1^{st}$ group is generated based on data stored in the same first-type memory chip. The retry error correction code stored in the first-type memory chip included in the $1^{st}$ group is for performing second-level memory error correction on the data stored in the same first-type memory chip.

In embodiments of this application, the running error correction code may also be referred to as first-level correction code, and the retry error correction code may also be referred to as second-level correction code.

In some other embodiments, the first-type memory chip is further configured to implement a function of bad block management on the first-type memory chip. In comparison with disposing a memory chip for implementing bad block management on the storage class memory, disposing a medium for implementing bad block management in the first-type memory chip saves space of the storage class memory, so that the storage class memory is more easily compatible with a memory (such as a DRAM) that meets the DDR protocol, and the universality of the storage class memory is improved.

The storage class memory may further include another chip, such as a clock chip.

The following describes in detail the storage class memory provided in embodiments of this application with reference to the accompanying drawings.

For example, the storage class memory is compatible with a DDR5 whose memory bit width is 80 bits. FIG. 1 is a schematic diagram of a structure of a storage class memory according to an embodiment of this application. A storage class memory 100 includes 10 memory chips 110, and a bit width of each memory chip 110 is 8 bits. The 10 memory chips 110 are divided into two groups, each group includes five memory chips 110, and a sum of bit widths of the five memory chips 110 included in each group is 40 bits. If a sum of bit widths of the five memory chips 110 included in the two groups is 80 bits, the storage class memory 100 is compatible with the memory bit width of the DDR5. It may be understood that the two groups obtained by dividing the 10 memory chips 110 refer to two sub-channels of the DDR5. This is compatible with a dual-channel standard of the DDR5. A bit width of each sub-channel is 40 bits.

Each group includes four first-type memory chips 111 and one second-type memory chip 112. A unit data access amount of each bit in the bit width of the memory chip 110 is 16 bytes or 32 bytes, in other words, each time the storage class memory is accessed, 16 B or 32 B data may be obtained after a specific latency. If four first-type memory chips 111 are accessed at a time, 64 B data can be read or written. If eight first-type memory chips 111 are accessed at a time, 128 B data can be read or written. 64 B or 128 B is equal to a length of a cache line of a processor, so that universality of the storage class memory is improved.

The second-type memory chip 112 is configured to store running error correction code. The first-type memory chip 111 is configured to store data and retry error correction code. A length of a codeword of the running error correction code is determined by the first-type memory chip 111 and the second-type memory chip 112 in the group. For example, if four first-type memory chips 111 are accessed at a time, 64 B data can be read or written, and the length of the codeword of the running error correction code is 64 B+16 B. If eight first-type memory chips 111 are accessed at a time, 128 B data can be read or written, and the length of the codeword of the running error correction code is 128 B+32 B. A length of a codeword of the retry error correction code may be autonomously set by the retry error correction code based on a reliability requirement.

Figure 2:
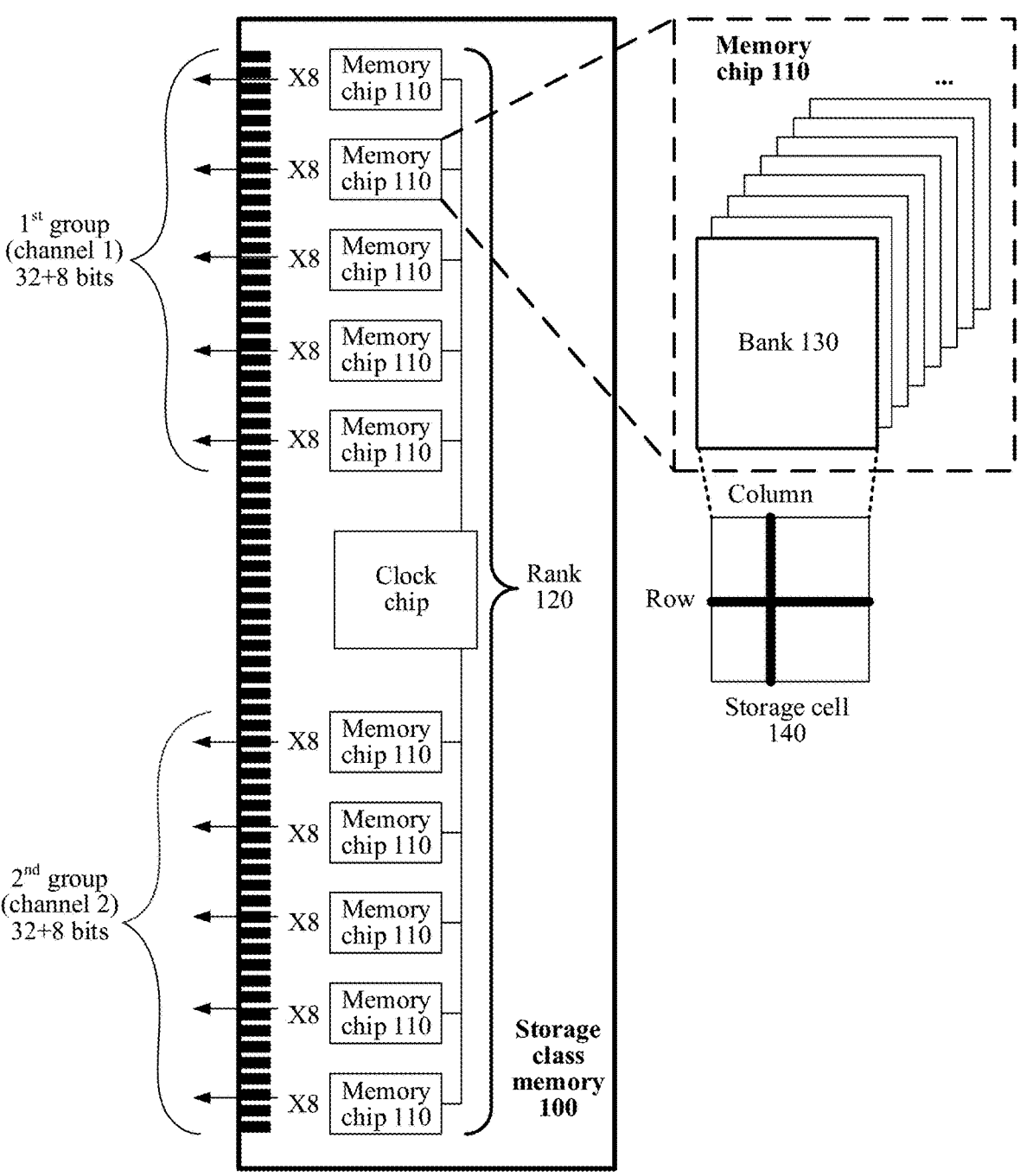
FIG. 2 is a schematic diagram of physical division of a storage class memory according to an embodiment of this application.

It may be understood that, as shown in FIG. 2, the storage class memory 100 may be physically divided into a rank 120, a memory chip 110, a bank 130, and a storage cell 140 in descending order of hierarchies. The rank 120 includes all memory chips 110 disposed on the storage class memory 100. Each memory chip 110 includes a plurality of banks 130. Each bank 130 includes the storage cell 140. Each storage cell 140 is determined by a row and a column.

In some embodiments, a medium used by the first-type memory chip 111 to store the retry error correction code may be a part of banks 130 in the plurality of banks 130 included in the first-type memory chip 111. For example, the first-type memory chip 111 includes M first-type banks 131 and N second-type banks 132. The first-type bank 131 is configured to store data. The second-type bank 132 is configured to store the retry error correction code. During actual application, a quantity M of first-type banks 131 and a quantity N of second-type banks 132 may be flexibly configured based on a reliability requirement. If the reliability requirement is low and an amount of data on which second-level memory error correction is performed is small, fewer second-type banks 132 and more first-type banks 131 may be configured. If the reliability requirement is high and an amount of data on which second-level memory error correction is performed is large, more second-type banks 132 may be configured. A memory controller or firmware (FW) can switch or upgrade the quantity M of first-type banks 131 and the quantity N of second-type banks 132 online based on a usage scenario, to improve flexibility to adapt to reliability requirements of different systems.

Figure 3:
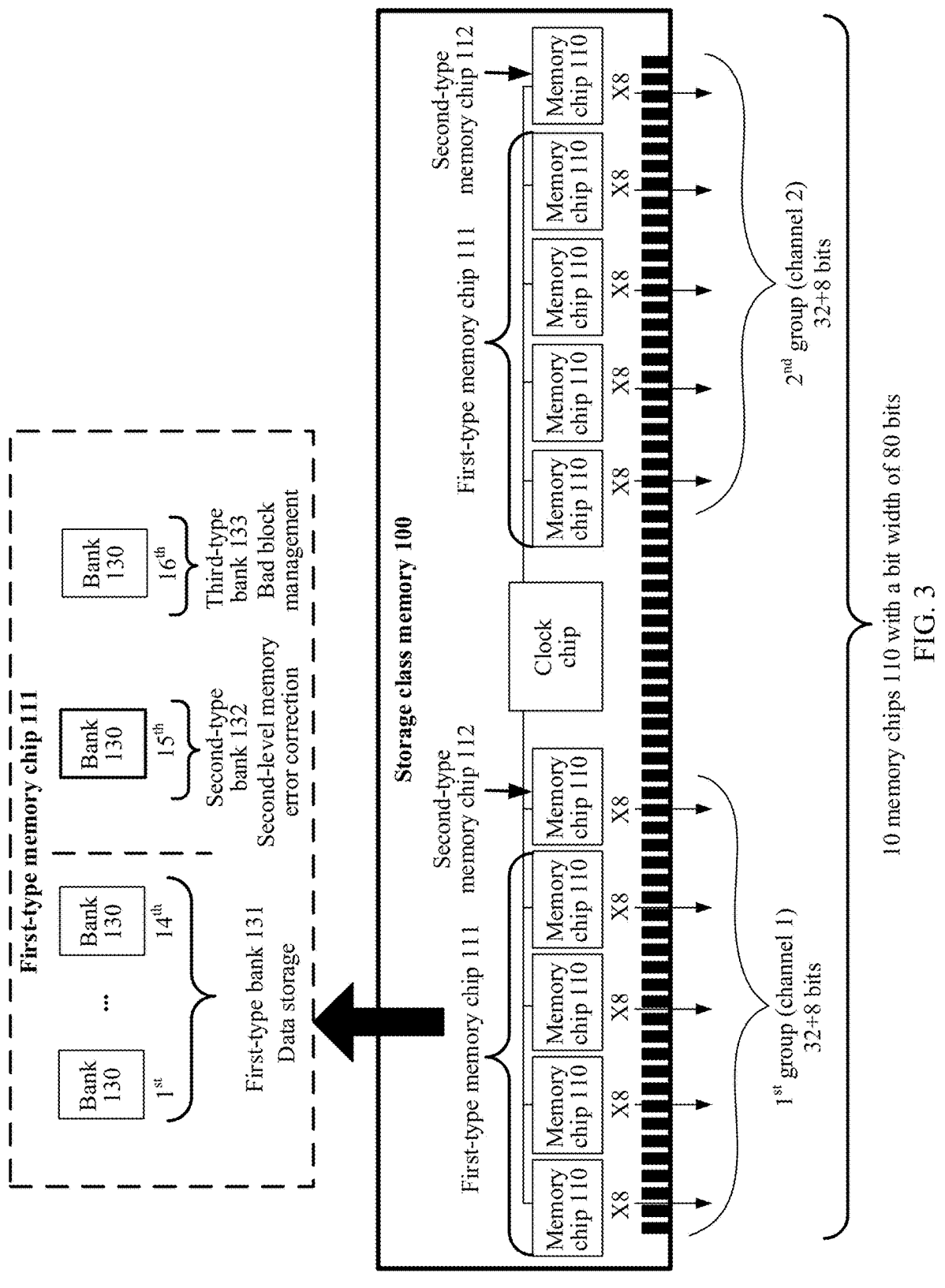
FIG. 3 is a schematic diagram of a structure of a first-type memory chip according to an embodiment of this application.

For example, as shown in FIG. 3, the first-type memory chip 111 includes 16 banks 130 that can be independently operated. The $1^{st}$ bank 130 to the $14^{th}$ bank 130 serve as the first-type banks 131, and are configured to store data. The $15^{th}$ bank 130 serves as the second-type bank 132, and is configured to perform second-level memory error correction. Optionally, the $16^{th}$ bank 130 in the first-type memory chip 111 serves as a third-type bank 133, and is configured to implement a function of bad block management on the banks 130 of the first-type memory chip 111. When a bank in the $1^{st}$ bank 130 to the $15^{th}$ bank 130 is faulty, the faulty bank 130 may be replaced with the $16^{th}$ bank 130, to avoid a fault of the storage class memory 100. For example, when some addresses of a bank in the $1^{st}$ bank 130 to the $15^{th}$ bank 130 are damaged, the controller remaps a corresponding address of the 16 B to the reserved $16^{th}$ bank 130, so that the function of bad block management can be implemented.

16 B or 32 B data may be read or written when the bank 130 is accessed at a time. It is assumed that 16 B data may be read or written when the bank 130 is accessed at a time, the length of the codeword of the retry error correction code may be 224 B (16*14)+16 B. Because the codeword of the retry error correction code is long, an error correction capability of the second-level memory error correction is also strong. This is only one of manners to construct the codeword of the retry error correction code. In some other embodiments, the codeword of the retry error correction code may alternatively be constructed by using data stored in a part of first-type banks 131 in the plurality of first-type banks 131. During the second-level memory error correction, error checking and error correction are cyclically performed on the banks 130 included in the first-type memory chip 111.

Figure 4:
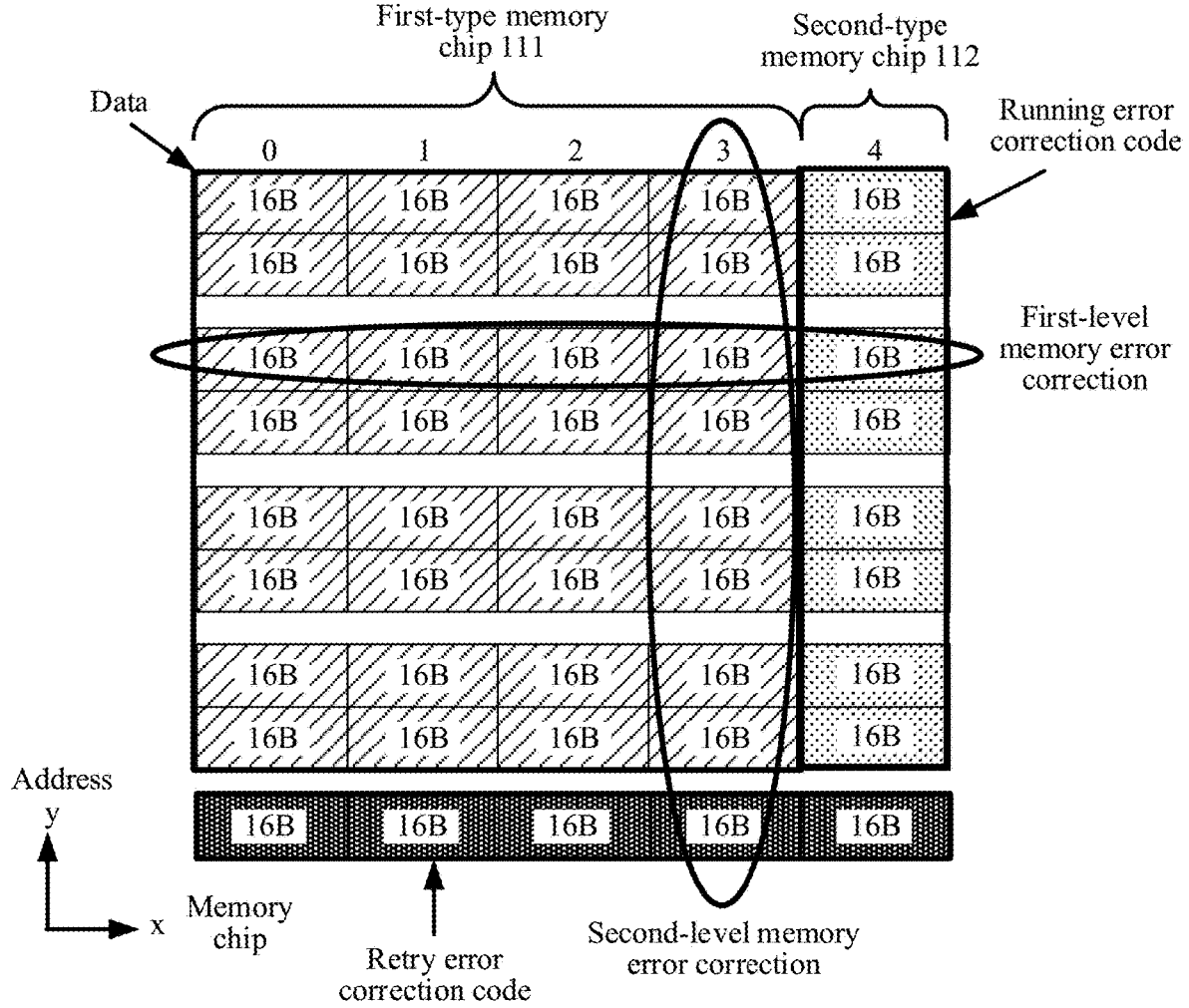
FIG. 4 is a schematic diagram of generation of a running error correction code and a retry error correction code according to an embodiment of this application.

For example, as shown in FIG. 4, data on which first-level memory error correction is performed and data on which the second-level memory error correction is performed may form a two-dimensional matrix. An x dimension represents four first-type memory chips 111 and one second-type memory chip 112, and a y dimension represents an address of a smallest access unit 16 B of a memory chip. The four first-type memory chips 111 store data and retry error correction code, and the second-type memory chip 112 stores running error correction code. Each row forms a 64 B+16 B codeword of the running error correction code. The entire two-dimensional matrix forms a 512 B+208 B codeword of the retry error correction code. After decoding of a codeword of running error correction code in any row fails, a system reads data of the two-dimensional matrix to perform second-level memory error correction, in other words, performs second-level memory error correction on data in each column. The system may perform horizontal decoding and vertical decoding in parallel, to effectively reduce an error correction rate of the system.

In some embodiments, the data of the first-type memory chip 111 in each column in the two-dimensional matrix may be data of any eight banks 130 in the $1^{st}$ bank 130 to the $14^{th}$ bank 130, and the eight banks 130 may be continuous. For example, data of a first-type memory chip 111 in the $1^{st}$ column may be data of the $1^{st}$ bank 130 to the $8^{th}$ bank 130, and retry error correction code stored in the first-type memory chip 111 in the $1^{st}$ column is generated based on the data of the $1^{st}$ bank 130 to the $8^{th}$ bank 130. The retry error correction code stored in the first-type memory chip 111 in the $1^{st}$ column is for performing memory error correction on the data of the $1^{st}$ bank 130 to the $8^{th}$ bank 130.

For another example, data of a first-type memory chip 111 in the $2^{nd}$ column may be data of the $3^{rd}$ bank 130 to the $10^{th}$ bank 130, and retry error correction code stored in the first-type memory chip 111 in the $2^{nd}$ column is generated based on the data of the $3^{rd}$ bank 130 to the $10^{th}$ bank 130. The retry error correction code stored in the first-type memory chip 111 in the $2^{nd}$ column is for performing memory error correction on the data of the $3^{rd}$ bank 130 to the $10^{th}$ bank 130.

In addition, the data of the first-type memory chip 111 for generating the retry error correction code is selected based on a reliability requirement. In other words, if the reliability requirement is high, each column in the two-dimensional matrix includes data of more banks 130. If the reliability requirement is low, each column in the two-dimensional matrix includes data of fewer banks 130. The second-type bank 132 in the first-type memory chip 111 may store retry error correction code generated by different first-type banks 131. For example, the second-type bank 132 in the first-type memory chip 111 in the $1^{st}$ column may store retry error correction code generated based on the data of the $1^{st}$ bank 130 to the $8^{th}$ bank 130, and retry error correction code generated based on the data of the $3^{rd}$ bank 130 to the $10^{th}$ bank 130, so that the controller performs memory error correction on data of different first-type banks 131.

Error correction algorithms used for the first-level memory error correction and the second-level memory error correction provided in embodiments of this application include any one of parity-check code, hamming code, block code, or error correction code. An error correction algorithm used for the first-level memory error correction and an error correction algorithm used for the second-level memory error correction may be the same or different. This is not limited.

In an example, an error correction manner of a DDR5 may be reused in the first-level memory error correction. For example, the hamming code or the block code may be used in the first-level memory error correction. The memory error correction manner of the DDR5 has a low latency and an error correction capability that can cover most error scenarios of the storage class memory. Therefore, when an error rate of the storage class memory is low, an access latency can be effectively reduced under a condition of high reliability of data stored in the storage class memory.

When the first-level memory error correction cannot be performed or fails, the second-level memory error correction may be performed by using retry error correction code in a single or a plurality of first-type memory chips 111. For example, the block code or low-density parity-check code may be used in the second-level memory error correction. When the error rate of the storage class memory is high, the second-level memory error correction can effectively reduce the error rate of the storage class memory, ensure the high reliability of the data stored in the storage class memory, and prolong a service life of the storage class memory.

In the foregoing example, the first-level memory error correction is set between the first-type memory chips 111, in other words, the codeword of the running error correction code is constructed by using data of the first-type memory chips 111 that belong to a same group (channel), and the second-level memory error correction is set in the first-type memory chips 111, in other words, the codeword of the retry error correction code is constructed by using the data of the first-type memory chips 111. During actual application, a two-level memory error correction of the storage class memory may alternatively be set in another manner.

The foregoing embodiment is described by using an example in which a bit width of a memory chip is 8 bits. In another embodiment, the bit width of the memory chip used by the storage class memory may alternatively be 4 bits.

Figure 5:
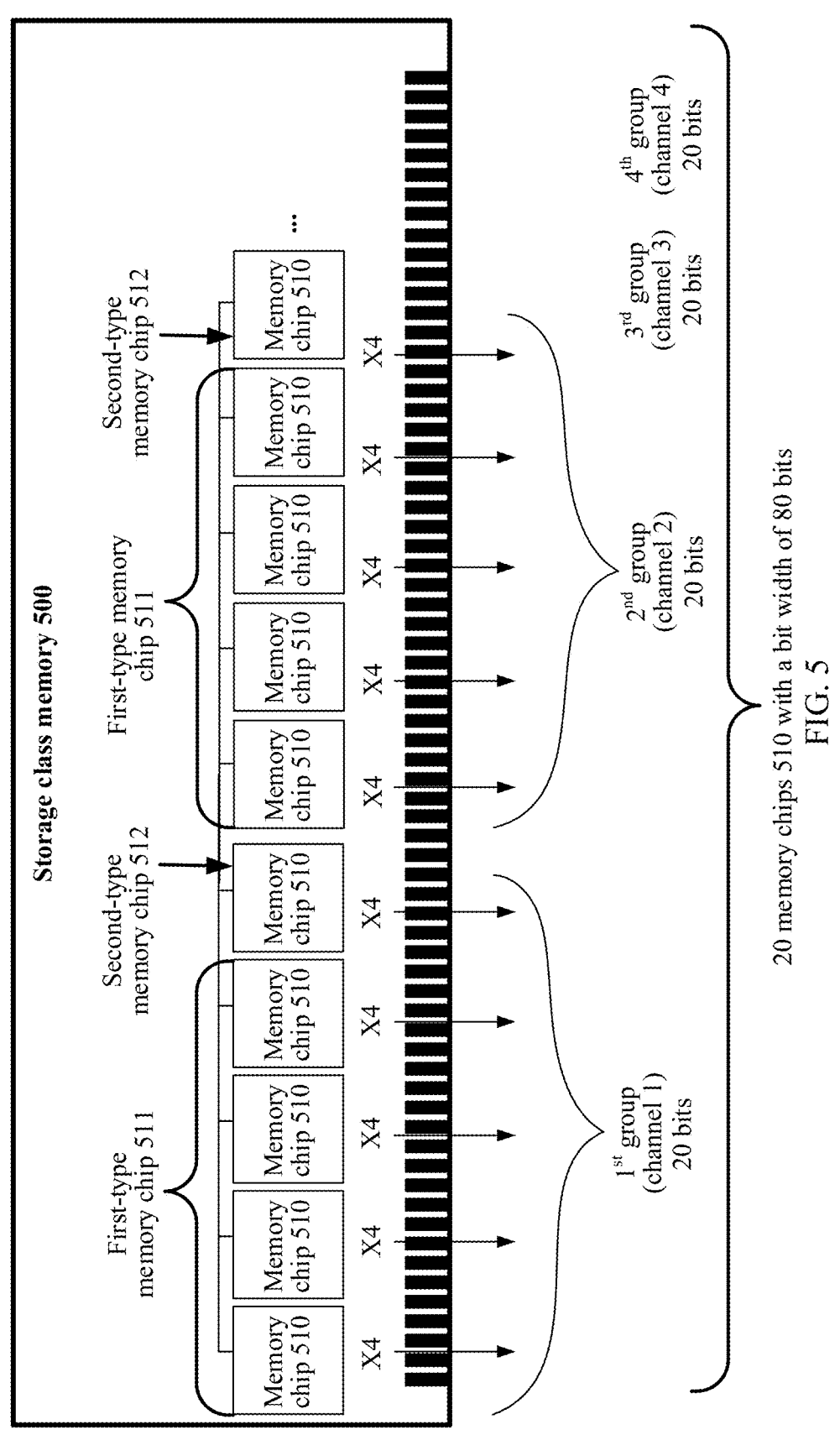
FIG. 5 is a schematic diagram of a structure of another storage class memory according to an embodiment of this application.

For example, as shown in FIG. 5, a storage class memory 500 includes 20 memory chips 510, and a bit width of each memory chip 510 is 4 bits. The 20 memory chips 510 are divided into four groups, each group includes five memory chips 510, and a sum of bit widths of the five memory chips 510 included in each group is 20 bits. If a sum of bit widths of the 20 memory chips 510 included in the four groups is 80 bits, the storage class memory 500 is compatible with a memory bit width of a DDR5. Each group includes four first-type memory chips 511 and one second-type memory chip 512.

Figure 6:
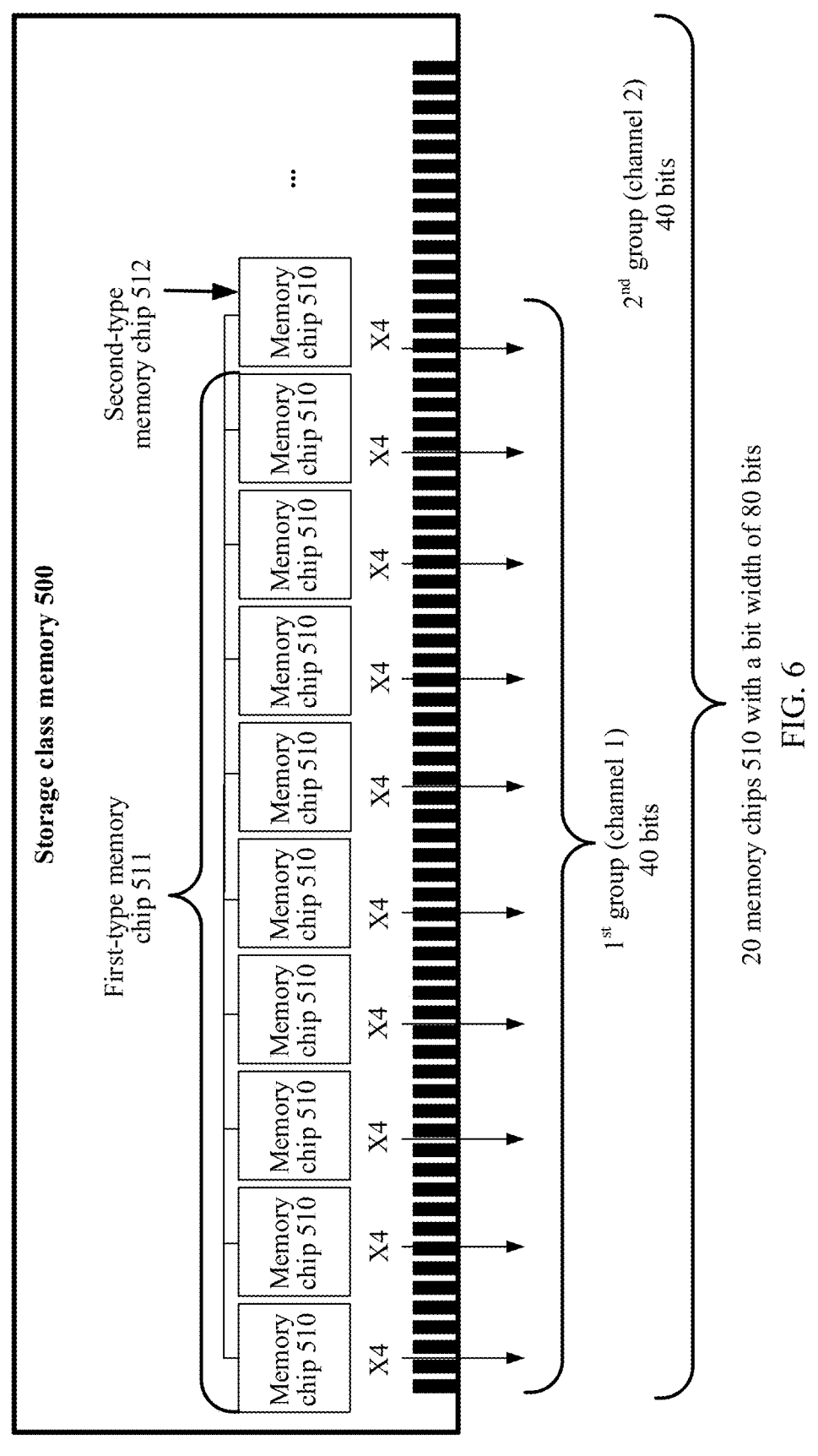
FIG. 6 is a schematic diagram of a structure of still another storage class memory according to an embodiment of this application.

Optionally, as shown in FIG. 6, the 20 memory chips 510 included in the storage class memory 500 may alternatively be divided into two groups, each group includes 10 memory chips 510, and a sum of bit widths of the 10 memory chips 510 included in each group is 40 bits. If a sum of bit widths of the 20 memory chips 510 included in the two groups is 80 bits, the storage class memory 500 is compatible with the memory bit width of the DDR5. Each group includes nine first-type memory chips 511 and one second-type memory chip 512.

For detailed descriptions of the first-type memory chip 511 and the one second-type memory chip 512, refer to the foregoing descriptions of the first-type memory chip 111 and the one second-type memory chip 112.

When a storage class memory is used as a main memory, the storage class memory may be disposed on a computer device by using a dual-inline-memory-modules (DIMM) interface, so that a processor of the computer device performs a read/write operation on the storage class memory. The computer device may be an independent server or a computing device in a computing cluster.

A controller further needs to be disposed between the storage class memory and the processor. The controller is configured to implement functions such as instruction conversion, memory error correction, bad block management, and address mapping. In comparison with a solution in which a built-in controller of the storage class memory implements the memory error correction and a DRAM connected to the controller caches data, which causes uncertainty of an access latency of the SCM, the storage class memory provided in embodiments of this application does not need the built-in controller and the DRAM. A memory controller integrated in the processor connected to the storage class memory is used to control the storage class memory, or another external controller is connected between the processor and the storage class memory, to control the storage class memory, ensure a deterministic latency of accessing the storage class memory, and be compatible with the DDR protocol.

Figure 7:
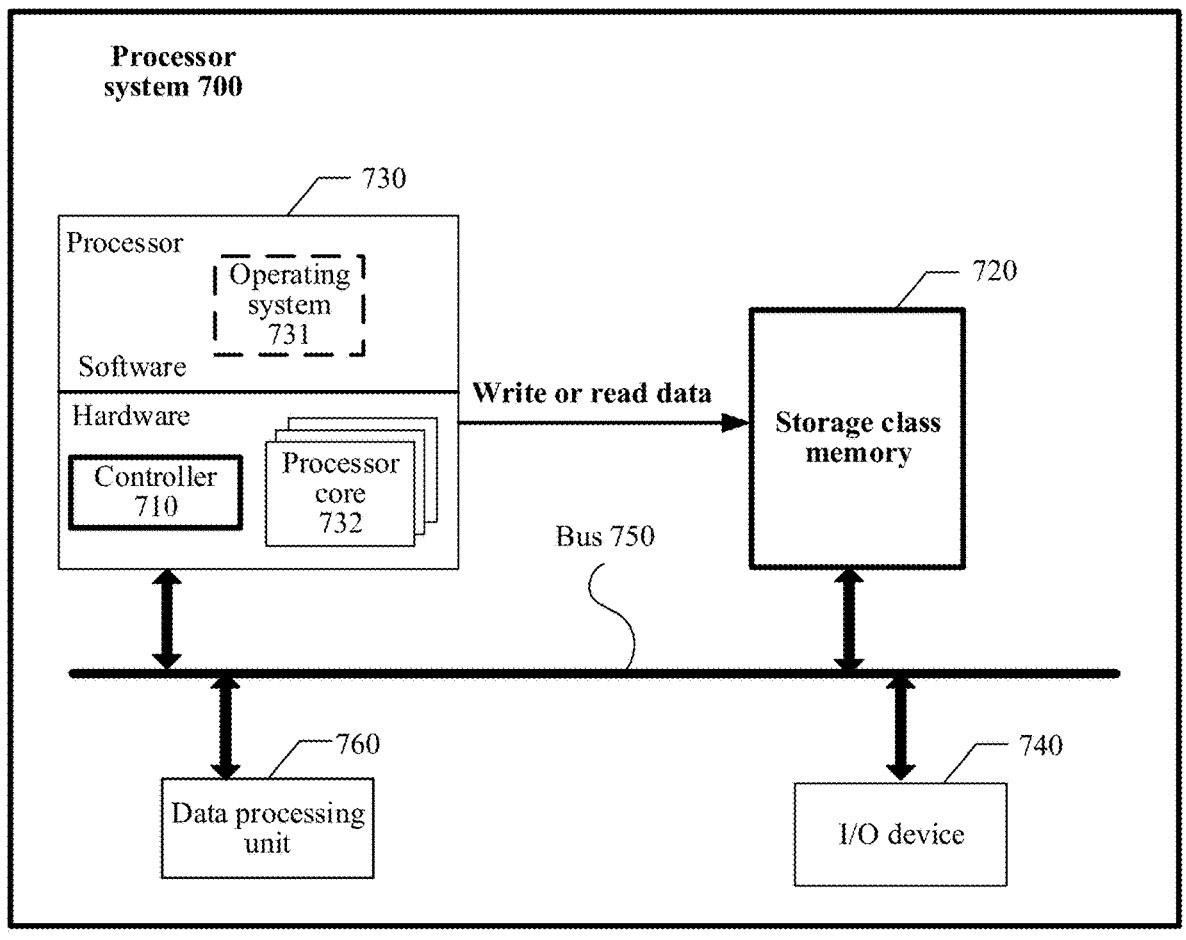
FIG. 7 is a schematic diagram of a structure of a processor system according to an embodiment of this application.

FIG. 7 is a schematic diagram of a processor system according to an embodiment of this application. A processor system 700 includes a controller 710, a storage class memory 720, and a processor 730. The processor system 700 may be a computer device, a server, a computing device in a computing cluster, or the like.

The processor 730 is a computing core and a control core of the processor system 700. The processor 730 may be a very large scale integrated circuit. An operating system 731 and another software program are disposed in the processor 730, to enable the processor 730 to access the storage class memory 720 and various peripheral component interconnect express (PCIe) devices. The processor 730 includes one or more processor cores 732. The processor core 732 in the processor 730 is, for example, a central processing unit (CPU) or another application-specific integrated circuit (ASIC). The processor 730 may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. During actual application, the processor system 700 may further include a plurality of processors.

In this embodiment of this application, the processor 730 is configured to write data to the storage class memory 720 or read data from the storage class memory 720.

The storage class memory 720 may be a main memory of the processor system 700. The storage class memory 720 is usually configured to store various types of software that are running in the operating system 731, input and output data, information exchanged with an external memory, and the like. To increase an access speed of the processor 730, the storage class memory 720 needs to have an advantage of a high access speed. The processor 730 can access the storage class memory 720 at a high speed by using the controller 710, and perform a read operation and a write operation on any storage cell in the storage class memory 720.

The controller 710 is a bus circuit controller that controls the storage class memory 720 inside the processor system 700 and that is configured to manage and plan data transmission from the storage class memory 720 to the processor core 732. By using the controller 710, data may be exchanged between the storage class memory 720 and the processor core 732.

Figure 8:
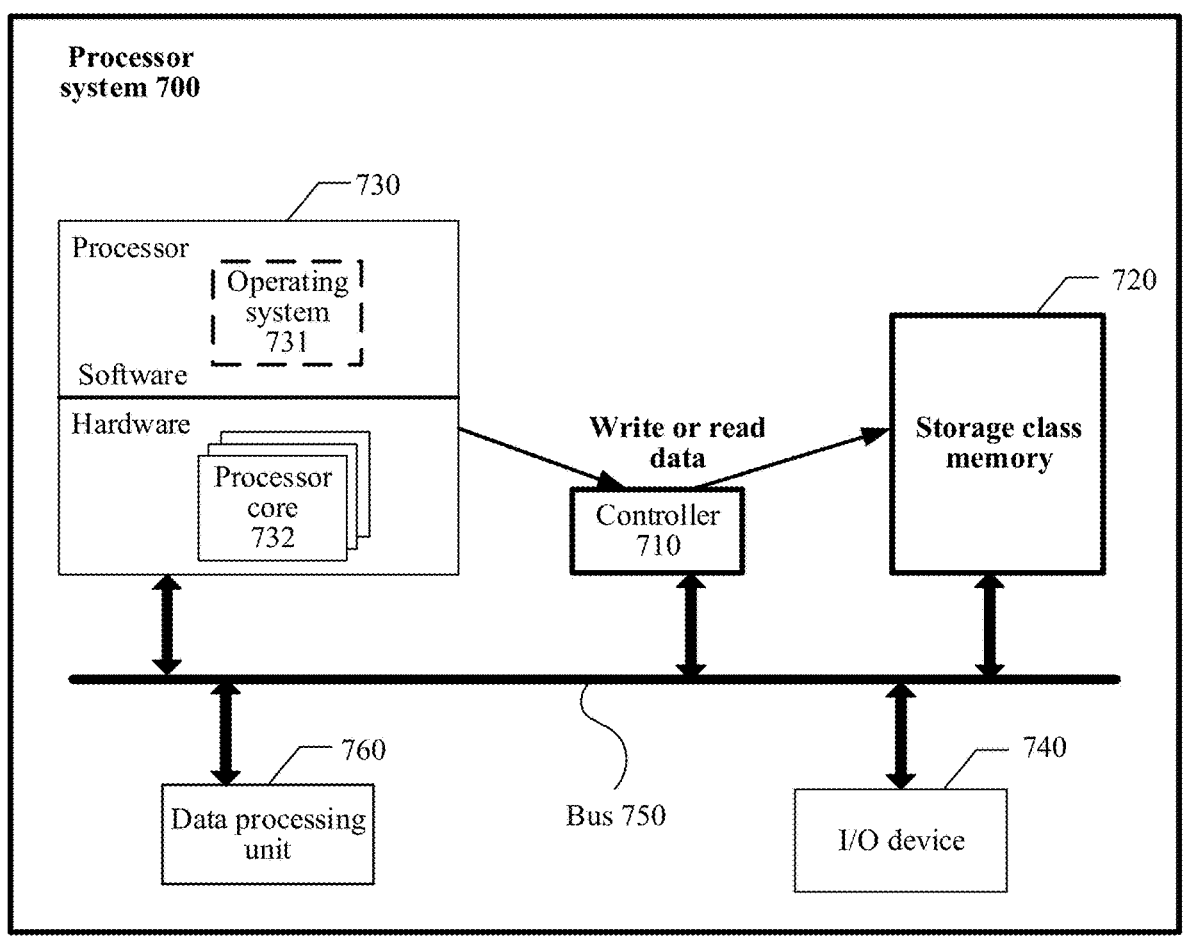
FIG. 8 is a schematic diagram of a structure of another processor system according to an embodiment of this application.

The controller 710 may be integrated into the processor 730, may be built in a northbridge, or may be an independent memory controller chip. The controller 710 may be a separate chip, and is connected to the processor core 732 through a system bus. For example, a difference from the processor system shown in FIG. 7 lies in that, as shown in FIG. 8, the controller 710 may be an external controller connected between the storage class memory 720 and the processor 730. The external controller may be a centralized controller, and the controller may be connected to a plurality of storage class memories 720, so that a storage capacity of the main memory of the processor system can be expanded, the storage class memory can be more easily compatible with a DDR protocol, to reduce costs of the controller.

A specific location and an existence form of a memory controller are not limited in this embodiment of this application. During actual application, the controller 710 may control necessary logic to write data to the storage class memory 720 or read data from the storage class memory 720. The controller 710 may be a memory controller in a processor system such as a general-purpose processor, a dedicated accelerator, a GPU, an FPGA, or an embedded processor.

The processor system 700 further includes various input/output (I/O) devices 740. The I/O device 740 is hardware for data transmission, or may be understood as a device connected to an I/O interface. Common I/O devices include a network adapter, a printer, a keyboard, a mouse, and the like. All external memories may also be used as I/O devices, such as hard disks, floppy disks, and optical disks.

The processor 730, the storage class memory 720, the controller 710, and the I/O device 740 are connected through a bus 750. The bus 750 may include a path for transmitting information between the foregoing components (for example, the processor 730 and the storage class memory 720). In addition to a data bus, the bus 750 may further include a power bus, a control bus, a status signal bus, and the like. However, for clarity of description, various buses are marked as the bus 750 in the figure. The bus 750 may be a PCIe bus, an extended industry standard architecture (EISA) bus, a unified bus (Ubus or UB), a compute express link (CXL) bus, a cache coherent interconnect for accelerators (CCIX) bus, or the like. For example, the processor 730 may access these I/O devices 740 through a PCIe bus. The processor 730 is connected to the storage class memory 720 through a double rate (double data rate, DDR) bus. Herein, different storage class memories 720 may communicate with the processor 730 through different data buses. Therefore, the DDR bus may be replaced with another type of data bus. A type of the bus is not limited in this embodiment of this application.

The processor system 700 further includes a DPU 760, and the DPU 760 may be connected to the processor 730 through a PCIe bus. The DPU 760 offloads applications that are related to artificial intelligence and storage and that are run by another chip (for example, the processor 730) of the processor system 700, to improve data processing performance of the processor system 700, and reduce load of the processor system 700. The processor system 700 may further include another dedicated processor. The dedicated processor is a processor for a specific application or field, for example, a graphics processing unit (GPU) configured to process graphics data or a DSP configured to process signals.

It should be noted that the processor system 700 may be referred to as a host. FIG. 7 is only a schematic diagram. The processor system 700 may further include another component, for example, may further include a hard disk, an optical drive, a power supply, a chassis, a heat dissipation system, and another input/output controller and interface, which are not shown in FIG. 7. A quantity of processors, storage class memories, and controllers included in the processor system 700 is not limited in this embodiment of this application.

Figure 9:
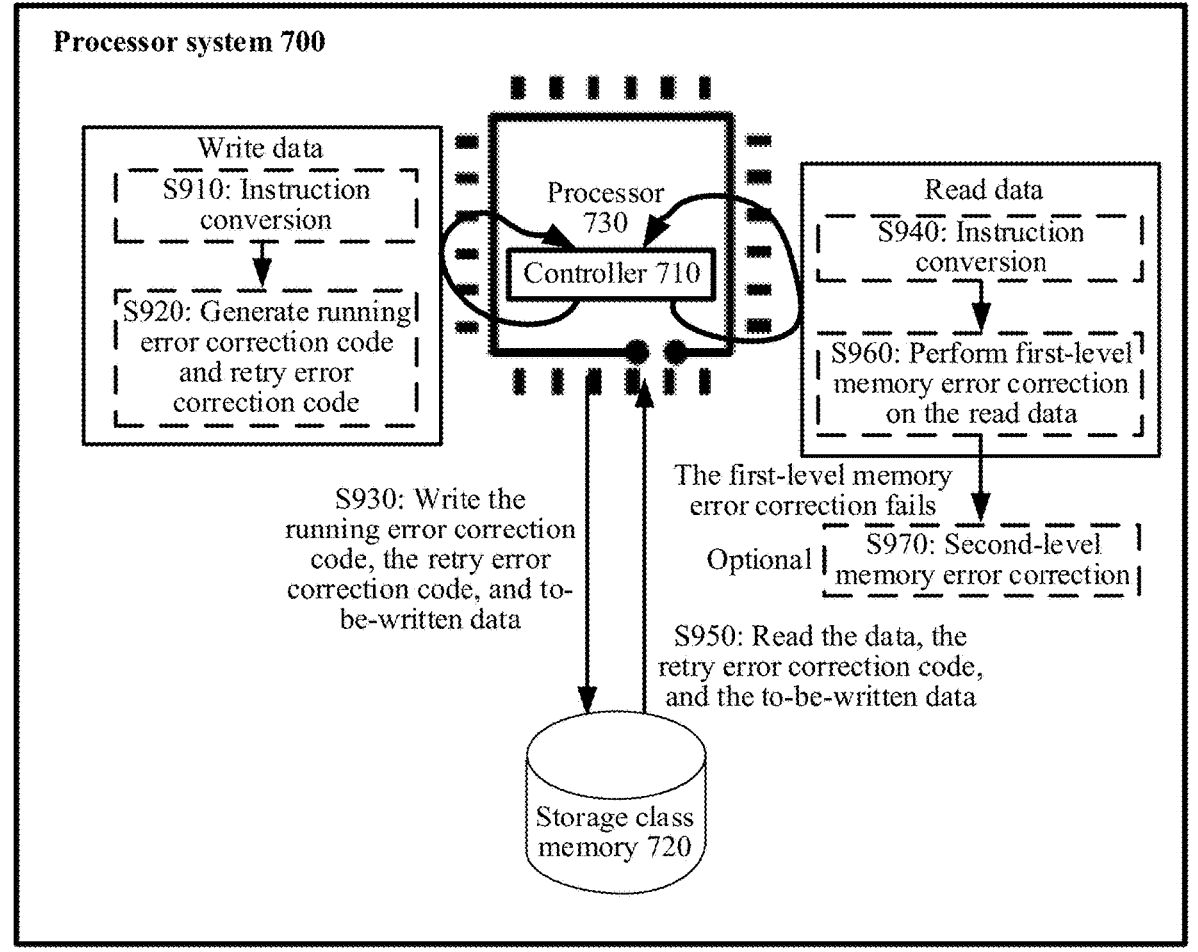
FIG. 9 is a schematic diagram of a data processing method according to an embodiment of this application.

Next, FIG. 9 is a schematic diagram of a data processing method according to an embodiment of this application. A structure shown in FIG. 7 is used as an example for description. It is assumed that the processor 730 writes data to the storage class memory 720 or reads data from the storage class memory 720. The data processing method provided in this embodiment of this application includes the following steps.

In some embodiments, when the processor 730 writes the data to the storage class memory 720, S910 to S930 are performed.

S910: The controller 710 performs instruction conversion, in other words, the controller 710 converts a write instruction of the processor 730 into a write instruction that can be recognized by the storage class memory 720.

S920: The controller 710 generates running error correction code and retry error correction code based on to-be-written data.

The controller 710 determines a location at which the to-be-written data is written into a first-type memory chip in the storage class memory 720. For example, the controller 710 performs address mapping, in other words, converts a logical block address into a physical block address. The logical block address (LBA) describes a virtual address of a block in which data on a storage device is located, and is generally used in an auxiliary memory device such as a hard disk. The LBA may refer to an address of a data block or a data block to which an address points. The physical block address (PBA) describes a physical address of a block in which data on a storage device is located. There is a one-to-one mapping relationship between the LBA and the PBA, and the mapping relationship is usually stored in a main memory. In this embodiment of this application, the mapping relationship between the LBA and the PBA may be stored in the storage class memory. When determining to write the to-be-written data to the storage class memory 720, the controller 710 first determines the logical block address, then determines the physical block address of the storage class memory 720 based on the logical block address and the mapping relationship between the LBA and the PBA, to write the to-be-written data to the storage class memory 720 based on the physical block address.

Further, the controller 710 generates the running error correction code based on an error correction algorithm (for example, hamming code or block code) by using data that is in the to-be-written data and that is written into first-type memory chips in a same group, and generates the retry error correction code based on an error correction algorithm (for example, block code or low-density parity-check code) by using the data written into the first-type memory chips in the same group.

S930: The controller 710 writes the running error correction code, the retry error correction code, and the to-be-written data into the storage class memory 720.

The controller 710 writes the to-be-written data to the determined location of the first-type memory chip, writes the running error correction code to a second-type memory chip, and writes the retry error correction code to a second-type bank of the first-type memory chip.

In some other embodiments, when the processor 730 reads the data from the storage class memory 720, S940 to S970 are performed.

S940: The controller 710 performs instruction conversion, in other words, the controller 710 converts a read instruction of the processor 730 into a read instruction that can be recognized by the storage class memory 720.

S950: The controller 710 reads the data, running error correction code, and retry error correction code from the storage class memory 720.

The controller 710 determines a storage location of the data in the storage class memory 720, to be specific, first determines a logical block address, and then determines a physical block address of the storage class memory 720 based on the logical block address and a mapping relationship between the LBA and the PBA, to read the data from the storage class memory 720 based on the physical block address.

S960: The controller 710 performs first-level memory error correction on the read data, in other words, checks the read data by using the running error correction code.

In some embodiments, the controller 710 determines the storage location of the data, reads the data and the running the error correction code based on the storage location. The controller 710 generates temporary running error correction code by using the read data based on an error correction algorithm (for example, hamming code or block code), and compares the temporary running error correction code with the running error correction code. If the temporary running error correction code and the running error correction code are the same, it indicates that the read data is correct. If the temporary running error correction code and the running error correction code are different, it indicates that there is an error in the read data. If the read data does not match stored code, the read data can be decrypted by using a parity-check bit, to determine a bit in error, and then correct the bit in error.

Optionally, if the first-level memory error correction fails, S970 is performed. The controller 710 performs second-level memory error correction, in other words, checks data of a first-type memory chip by using the retry error correction code. For example, the controller 710 performs, by using block code or low-density parity-check code and by using the retry error correction code, second-level memory error correction on the data stored in the first-type memory chip.

In a data processing process, the controller 710 may continuously scan data by using an algorithm (for example, hamming code) algorithm, to check and correct a memory error of each bit.

A method for determining a location at which the controller 710 writes the data to the storage class memory 720 and a location at which the controller 710 reads the data from the storage class memory 720 is not limited in this embodiment of this application. For details, refer to a conventional technology. In addition, a method for generating the running error correction code and the retry error correction code, and a method for checking the read data by using the running error correction code and the retry error correction code may also reuse the conventional technology.

It may be understood that, to implement functions in the foregoing embodiments, a computing device includes corresponding hardware structures and/or software modules for performing the functions. A person skilled in the art should be easily aware that, in combination with the banks and the method steps in the examples described in embodiments disclosed in this application, this application can be implemented by using hardware or a combination of hardware and computer software. Whether a function is performed by using hardware or hardware driven by computer software depends on a particular application scenario and design constraint condition of the technical solutions.

The method steps in this embodiment may be implemented in a hardware manner, or may be implemented by executing software instructions by a processor. The software instructions may include a corresponding software module. The software module may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information to the storage medium. Certainly, the storage medium may be a component of the processor. The processor and the storage medium may be disposed in an ASIC. In addition, the ASIC may be located in a computing device. Certainly, the processor and the storage medium may alternatively exist as discrete components in a network device or a terminal device.

All or a part of the foregoing embodiments may be implemented by using software, hardware, firmware, or any combination thereof. When software is used to implement embodiments, all or a part of embodiments may be implemented in a form of a computer program product. The computer program product includes one or more computer programs and instructions. When the computer programs or instructions are loaded and executed on a computer, all or a part of the processes or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

The foregoing descriptions are merely example embodiments of this application, but are not intended to limit the protection scope of this application. Any modification or replacement readily figured out by a person skilled in the art within the technical scope disclosed in this application may fall within the protection scope of this application.

What is claimed is:

1. A storage class memory, comprising:
a plurality of memory chips, wherein the plurality of memory chips include at least one group, wherein each group of the at least one group comprises a first-type memory chip and a second-type memory chip;
wherein the first-type memory chip is configured to store:
data; and
retry error correction code:
wherein the second-type memory chip is configured to store running error correction code for performing first-level memory error correction on the data stored in the first-type memory chip in the same group as the second-type memory chip; and
wherein the retry error correction code is for performing second-level memory error correction on the data stored in the first-type memory chip in case of failure of the first-level memory error correction.

2. The storage class memory according to claim 1, wherein the first-type memory chip comprises M first-type banks and N second-type banks, wherein the M first-type banks are configured to store data, and wherein the N second-type banks are configured to store the retry error correction code.

3. The storage class memory according to claim 2, wherein a unit data access amount of a respective first-type bank and a unit data access amount of a respective second-type bank each are a unit data access amount of one bit in a bit width of the first-type memory chip.

4. The storage class memory according to claim 2, wherein the first-type memory chip further comprises a third-type bank, wherein the third-type bank is configured to implement a function of bad block management on a bank of the first-type memory chip.

5. The storage class memory according to claim 1, wherein a bit width of the storage class memory meets a memory bit width indicated by a double data rate (DDR) protocol.

6. The storage class memory according to claim 5, wherein a quantity of first-type memory chips and a quantity of second-type memory chips in each group are determined based on a bit width of the first-type memory chip, a bit width of the second-type memory chip, and the memory bit width indicated by the DDR protocol.

7. The storage class memory according to claim 6, wherein the memory bit width indicated by the DDR protocol is 80 bits;
wherein both the bit width of the first-type memory chip and the bit width of the second-type memory chip are 8 bits;
wherein the storage class memory comprises ten memory chips divided into two groups, wherein each group of the two groups comprises four first-type memory chips and one second-type memory chip;
wherein a sum of bit widths of the four first-type memory chips and the second-type memory chip comprised in each group is 40 bits, and a unit data access amount of each bit is 16 bytes or 32 bytes.

8. A data processing method, comprising:
performing, by a controller connected to at least one storage class memory and a processor, first-level memory error correction on data stored in a first-type memory chip of the at least one storage class memory; and based on failure of the first-level memory error correction, obtaining, by the controller, the data stored in the first-type memory chip, and performing second-level memory error correction on the data stored in the first-type memory chip based on retry error correction code stored in the first-type memory chip, wherein the retry error correction code is for performing the second-level memory error correction on the data stored in the first-type memory chip in case of failure of the first-level memory error correction.

9. The method according to claim 8, wherein performing the first-level memory error correction on the data stored in the first-type memory chip includes using hamming code; and wherein performing the second-level memory error correction on the data stored in the first-type memory chip includes using low-density parity-check code.

10. The method according to claim 8, wherein performing first-level memory error correction on the data stored in the first-type memory chip comprises: performing, by the controller, first-level memory error correction on a single bit in 128 bytes to 512 bytes of the data stored in the first-type memory chip; and wherein performing second-level memory error correction on the data stored in the first-type memory chip comprises: performing, by the controller, second-level memory error correction on hundreds of bits in 2048 bytes to 4096 bytes of the data stored in the first-type memory chip.

11. The method according to claim 8, further comprising: converting, by the controller, instructions of the processor into instructions of the storage class memory, and converting instructions of the storage class memory into instructions of the processor.

12. A processor system, comprising:

a storage class memory, comprising a plurality of memory chips, wherein the plurality of memory chips include at least one group, wherein each group of the at least one group comprises a first-type memory chip configured to store data and retry error correction code, wherein the retry error correction code is for performing second-level memory error correction on the data stored in the first-type memory chip in case of failure of the first-level memory error correction;

a processor; and a controller separately connected to the processor and the storage class memory, wherein the controller is configured to:

perform first-level memory error correction on data stored in a respective first-type memory chip; and obtain the data stored in the respective first-type memory chip and perform second-level memory error correction on the data stored in the respective first-type memory chip in case of failure of the first-level memory error correction performed on the data stored in the respective first-type memory chip.

13. The system according to claim 12, wherein each group of the at least one group further comprises a second-type memory chip configured to store running error correction code for performing first-level memory error correction on data stored in a first-type memory chip in a same group as the second-type memory chip.

14. The system according to claim 13, wherein a bit width of the storage class memory meets a memory bit width indicated by a double data rate (DDR) protocol.

15. The system according to claim 14, wherein a quantity of first-type memory chips and a quantity of second-type memory chips in each group are determined based on a bit width of the first-type memory chip, a bit width of the second-type memory chip, and the memory bit width indicated by the DDR protocol.

16. The system according to claim 15, wherein the memory bit width indicated by the DDR protocol is 80 bits;

wherein both the bit width of the first-type memory chip and the bit width of the second-type memory chip are 8 bits;

wherein the storage class memory comprises ten memory chips divided into two groups, wherein each group comprises four first-type memory chips and one second-type memory chip;

wherein a sum of bit widths of the four first-type memory chips and the second-type memory chip comprised in each group is 40 bits, and a unit data access amount of each bit is 16 bytes or 32 bytes.

17. The system according to claim 15, wherein performing first-level memory error correction on the data stored in the respective first-type memory chip includes using hamming code; and wherein performing second-level memory error correction on the data stored in the respective first-type memory chip includes using low-density parity-check code.

18. The system according to claim 12, wherein the respective first-type memory chip comprises M first-type banks and N second-type banks, wherein the M first-type banks are configured to store data, and the N second-type bank are configured to store the retry error correction code.

19. The system according to claim 18, wherein the respective first-type memory chip further comprises a third-type bank, wherein the third-type bank is configured to implement a function of bad block management on a bank of the first-type memory chip.

20. The system according to claim 12, wherein performing first-level memory error correction on the data stored in the respective first-type memory chip comprises: performing first-level memory error correction on a single bit in 128 bytes to 512 bytes of the data stored in the respective first-type memory chip; and wherein performing second-level memory error correction on the data stored in the respective first-type memory chip comprises: performing second-level memory error correction on hundreds of bits in 2048 bytes to 4096 bytes of the data stored in the respective first-type memory chip.

* * * * *